(12) United States Patent
Manepalli et al.

(10) Patent No.: US 12,511,887 B2
(45) Date of Patent: Dec. 30, 2025

(54) OBJECT IDENTIFICATION BASED ON ADAPTIVE LEARNING

(71) Applicant: Intel Corporation, Santa Clara, CA (US)

(72) Inventors: Sangeeta Ghangam Manepalli, Chandler, AZ (US); Siew Wen Chin, Penang (MY); Ping Guo, Beijing (CN); Qi She, Beijing (CN); Yingzhe Shen, Beijing (CN); Lidan Zhang, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 17/999,709

(22) PCT Filed: Jun. 24, 2020

(86) PCT No.: PCT/CN2020/098048
§ 371 (c)(1),
(2) Date: Nov. 23, 2022

(87) PCT Pub. No.: WO2021/258329
PCT Pub. Date: Dec. 30, 2021

(65) Prior Publication Data
US 2023/0206612 A1    Jun. 29, 2023

(51) Int. Cl.
*G06V 10/80* (2022.01)
*G06V 10/62* (2022.01)
(Continued)

(52) U.S. Cl.
CPC ............ *G06V 10/809* (2022.01); *G06V 10/62* (2022.01); *G06V 10/774* (2022.01); *G06V 10/776* (2022.01); *G06V 40/161* (2022.01)

(58) Field of Classification Search
CPC .... G06V 10/62; G06V 10/764; G06V 10/768; G06V 10/774; G06V 10/776;
(Continued)

(56) References Cited

U.S. PATENT DOCUMENTS

| 10,108,850 | B1 * | 10/2018 | Das | G06V 10/82 |
| 2003/0198368 | A1 * | 10/2003 | Kee | G06V 40/16 382/117 |

(Continued)

FOREIGN PATENT DOCUMENTS

| CN | 101510254 A |   | 8/2009 |
| CN | 104850828 A | * | 8/2015 |

(Continued)

OTHER PUBLICATIONS

Koo, Ja Hyung et al., "CNN-Based Multimodal Human Recognition in Surveillance Enironments", Sensors, Sep. 11, 2018, vol. 18 No. 9, https://www.mdpi.com/1424-8220/18/9/3040 retrieved on Feb. 20, 2023, 34 pages.

(Continued)

*Primary Examiner* — Chineyere Wills-Burns
*Assistant Examiner* — Emmanuel Silva-Avina
(74) *Attorney, Agent, or Firm* — Viering, Jentschura & Partner mbB

(57) ABSTRACT

Disclosed herein are systems, methods, and devices for using adaptive learning to identify objects. An object-identifying device performs a first object identification based on one or more features of a first modality of an object retrieved from an image frame including the object and a first database including first modality identification features. A second object identification is performed based on one or more features of a second modality of the object retrieved from the image frame and a second database including second modality identification features. The second database is updated by (Continued)

adaptively learning a new second modality identification feature according to a first identification result of the first object identification. The second object identification is trained with the updated second database and determines a final identification result by integrating a first identification result of the first object identification and a second identification result of the second object identification.

22 Claims, 9 Drawing Sheets

(51) Int. Cl.
  *G06V 10/774* (2022.01)
  *G06V 10/776* (2022.01)
  *G06V 40/16* (2022.01)
(58) Field of Classification Search
  CPC .... G06V 10/811; G06V 10/809; G06V 40/16; G06V 40/161; G06V 40/172; G06V 40/173; G06V 10/82; G06V 40/171; G06V 40/168
  USPC .......................................................... 382/159
  See application file for complete search history.

(56) References Cited

U.S. PATENT DOCUMENTS

| | | | |
|---|---|---|---|
| 2007/0237355 A1* | 10/2007 | Song | G06F 18/2323 382/100 |
| 2007/0237364 A1 | 10/2007 | Song et al. | |
| 2021/0034842 A1* | 2/2021 | Kang | G06V 40/10 |

FOREIGN PATENT DOCUMENTS

| | | | | |
|---|---|---|---|---|
| CN | 109558810 A | * | 4/2019 | ......... G06K 9/00369 |
| CN | 110717428 A | * | 1/2020 | |
| CN | 110795973 A | | 2/2020 | |
| CN | 110796079 A | | 2/2020 | |
| WO | 2020051016 A1 | | 3/2020 | |

OTHER PUBLICATIONS

Deng, Jiankang et al., "RetinaFace: Single-stage Dense Face Localisation in the Wild", dated May 4, 2019, retrieved from https://arxiv.org/abs/1905.00641 on Feb. 20, 2023, 10 pages.

Deng, Jiankang et al., "ArcFace: Additive Angular Margin Loss for Deep Face Recognition", Journal of Latex Class Files, vol. 14 No. 8, dated Aug. 2015, retrieved from https://arxiv.org/abs/1801.07698 on Feb. 20, 2023, 17 pages.

Howard, Andrew G. et al., "MobileNets: Efficient Convolutional Neural Networks for Mobile Vision Applications", dated Apr. 17, 2017, retrieved from https://arxiv.org/abs/1704.04861 on Feb. 20, 2023, 9 pages.

Zhang, Xuan et al., "AlignedReID: Surpassing Human-Level Performance in Person Re-Identification", dated Jan. 31, 2018, retrieved from https://arxiv.org/abs/1711.08184 on Feb. 20, 2023, 10 pages.

Sun, Xiaoxiao et al., "Dissecting Person Re-identification from the Viewpoint of Viewpoint", dated Jun. 17, 2019, retrieved from https://arxiv.org/abs/1812.02162 on Feb. 20, 2023, 10 pages.

European Search Report issued for the corresponding European patent application No. 20942255.9, dated Dec. 7, 2023, 9 pages (for informational purposes only).

International Search Report issued for the corresponding International application No. PCT/CN2020/098048, mailed Mar. 22, 2021, 4 pages (for informational purposes only).

Schroff, Florian et al., "Facenet: A unified embedding for face recognition and clustering" in CVPR, 2015, arXiv:1503.03832v3, 10 pages.

* cited by examiner

Algorithm 1 Adaptive learning and training process

Input: labeled face database $L_f$, unlabeled body data $U_b$, labeled body database $L_b$, body tracking result

Output: well-trained body classifier $C_b$

1: Initialize during registration
  2: while body tracking result do
  3:     Use face classifier $C_f$ to associate unlabeled body data $U_b$ with label identification $id_b$
  4:     Use face identification confidence to estimate confidence of assigning $id_b$ to $U_b$
  5:     Pick up self-labeled body data $(U_{p,sub} \subseteq U_b, id_{b,sub})$, and move to $L_b$
  6:     Train body classifier $C_b$ with $L_b$
  7: end while

FIG. 3

OBJECT IDENTIFICATION BASED ON ADAPTIVE LEARNING

CROSS-REFERENCE TO RELATED APPLICATION(S)

This application is a national phase application of PCT/CN2020/098048 filed on Jun. 24, 2020, the contents of which are fully incorporated herein by reference.

TECHNICAL FIELD

Embodiments of the present disclosure generally relate to the field of object identification, and more specifically to an object identification based on adaptive learning.

BACKGROUND

An object identification system may utilize object identification features to identify an object. The object identification features may be distinctive and measurable characteristics of the object that are associated with different modalities of the object and labeled with an identifier of the object.

For example, these labeled object identification features may be stored in a database. At a later time, one or more appearance features of the different modalities of the object may be captured for the purpose of identification. The captured appearance features may be compared with the labeled object identification features stored for the object in the database. When there is a match between the captured appearance features and the labeled object identification features stored for the object in the database, the object can be identified.

SUMMARY

In an aspect of the present application, a processor for object identification is provided and configured to: perform a first object identification based on one or more features of a first modality of an object retrieved from an image frame including the object and a first database including first modality identification features labeled with corresponding object identifiers; perform a second object identification based on one or more features of a second modality of the object retrieved from the image frame and a second database including second modality identification features labeled with corresponding object identifiers; update the second database by adaptively learning a new second modality identification feature according to a first identification result of the first object identification; train the second object identification with the updated second database; and determine a final identification result of the object identification by integrating a first identification result of the first object identification and a second identification result of the second object identification.

In an aspect of the present application, a device for object identification is provided and includes an image interface coupled to an image capture device; a data interface coupled to a data storage; and the processor for object identification as described above, wherein the processor is coupled to the image interface to retrieve the one or more features of the first modality of the object and the one or more features of the second modality of the object from the image frame including the object captured by the image capture device; and the processor is coupled to the data interface to access the first database including the first modality identification features and the second database including second modality identification features from the data storage.

In an aspect of the present application, a system for object identification is provided and includes: the processor for object identification as described above; an image capture device configured to capture the image frame including the object; and a data storage configured to store the first database including the first modality identification features and the second database including the second modality identification features, wherein the processor is coupled to the image capture device via an image interface to retrieve the one or more features of the first modality of the object and the one or more features of the second modality of the object from the image frame; and the processor is coupled to the data storage via a data interface to access the first database including the first modality identification features and the second database including the second modality identification features.

In an aspect of the present application, a method for object identification is provided and includes: performing a first object identification based on one or more features of a first modality of an object retrieved from an image frame including the object and a first database including first modality identification features labeled with corresponding object identifiers; performing a second object identification based on one or more features of a second modality of the object retrieved from the image frame and a second database including second modality identification features labeled with corresponding object identifiers; updating the second database by adaptively learning a new second modality identification feature according to a first identification result of the first object identification; training the second object identification with the updated second database; and determining a final identification result of the object identification by integrating a first identification result of the first object identification and a second identification result of the second object identification.

In an aspect of the present application, an apparatus for object identification is provided and includes: a first object identification module configured to perform a first object identification based on one or more features of a first modality of an object retrieved from an image frame including the object and a first database including first modality identification features labeled with corresponding object identifiers; a second object identification module configured to perform a second object identification based on one or more features of a second modality of the object retrieved from the image frame and a second database including second modality identification features labeled with corresponding object identifiers; an adaptive learning and training module configured to update the second database by adaptively learning a new second modality identification feature according to a first identification result of the first object identification, and train the second object identification with the updated second database; and a fusion module configured to determine a final identification result of the object identification by integrating a first identification result of the first object identification and a second identification result of the second object identification.

BRIEF DESCRIPTION OF THE DRAWINGS

Embodiments of the disclosure will be illustrated, by way of example and no limitation, in the figures of the accompanying drawings in which like reference numerals refer to similar elements.

FIG. 3 illustrates an exemplary algorithm for an adaptive learning and training process in accordance with an embodiment of the present application;

DETAILED DESCRIPTION OF EMBODIMENTS

Figure 1:
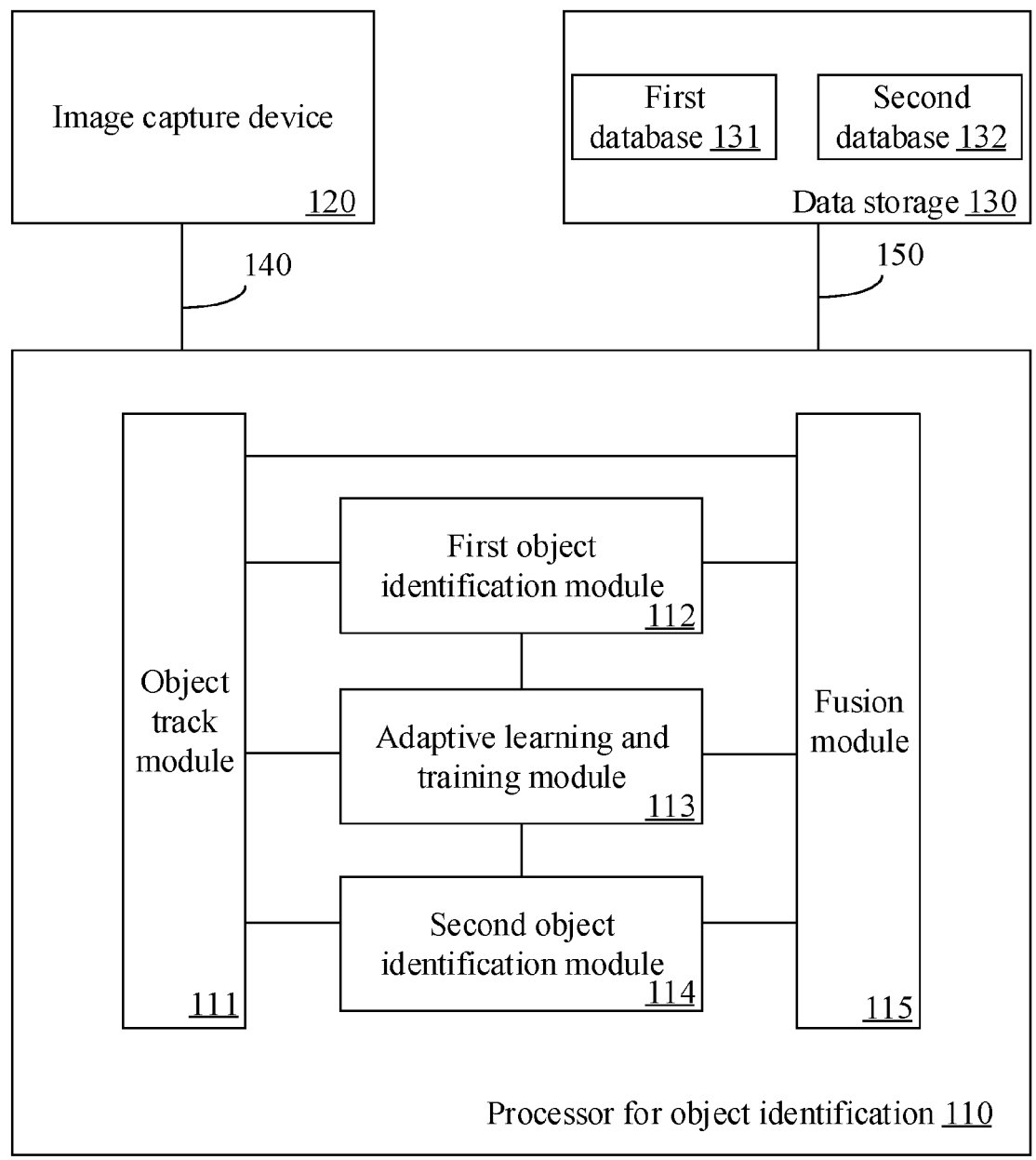
FIG. 1 illustrates a system for object identification based on adaptive learning and training in accordance with an embodiment of the present application.

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

As used in the description, the singular forms "a", "an" and "the" include express support for plural referents unless the context clearly dictates otherwise. For example, reference to "a previous image frame" may include a plurality of such image frames.

An object identification system may utilize object identification features to identify an object. The object identification features may be distinctive and measurable characteristics of the object that are associated with different modalities of the object and labeled with an identifier of the object. As used herein, the term "modality" may refer to a particular form in which a portion of the object appears or behaves and by which the object can be identified. The portion of the object may include one or more distinctive and measurable characteristics of the object.

For example, these labeled object identification features may be stored in a database. At a later time, one or more appearance features of the different modalities of the object may be captured for the purpose of identification. The captured appearance features may be compared with the labeled object identification features stored for the object in the database. When there is a match between the captured appearance features and the labeled object identification features stored for the object in the database, the object can be identified.

As an example, the object to be identified may be a person. Identifying a person from images or videos has become an essential task in many fields, like service robot, surveillance, etc. Generally, face features and body features can be utilized to identify a person. A lot of technologies have been developed to do identification according to either face features or body features, but there still exist some inherent problems. For face identification, when a face region of the person is invisible or when the face features have significantly changed or when the person has a large head pose, the performance of the face identification may drastically drop. For body identification, the performance of the body identification may be affected by e.g. noisy background resulted from illumination, misaligned detected person location, large body pose, changed clothes of the person and the like.

In order to improve the identification performance, a combination of both the face features and the body features may be collected and detected to identify the person. For example, a multimodal human recognition method is proposed by Ja Hyung Koo, etc. in an article titled "CNN-Based Multimodal Human Recognition in Surveillance Environments" and published in Sensors, 2018, 18 (9): 3040. The multimodal human recognition method uses both face features and body features and is based on a deep convolutional neural network (CNN). According to the multimodal human recognition method, the face identification and the body identification are separately trained through separate CNNs of VGG Face-16 and ResNet-50, and then the results of the face identification and the body identification are combined based on a score-level fusion by Weighted Sum rule to improve recognition performance.

The multimodal human recognition method proposed by Ja Hyung Koo, etc is more focusing on separately training the face identification and the body identification on a large-scale database before deploying a human recognition system for real-time person identification and then fusing the results of both the face identification and the body identification to get a final identification result. However, it may be critical to re-train the human recognition system automatically when the face features or body features change during the real-time person identification.

In view of the above issues, an object identification system which aims to identify a target object accurately and robustly is proposed in the present application. The object identification system may automatically integrate identification information from different modalities of the target object and provide a fused identification result robustly. In addition, the system may continuously and adaptively learn and accumulate appearance features of the object for realizing an accurate long-term identification.

In embodiments of the present application, the object may refer to any object to be identified, including but not limited to a person, an animal, a robot, a smart device and the like. Accordingly, the proposed system or method for object identification according to the embodiments of the present application may be applied to any area like an adaptive Human Robot Interaction (HRI) library, or any other industrial or retail environment.

FIG. 1 illustrates a system for object identification based on adaptive learning and training in accordance with an embodiment of the present application.

In the embodiment, as shown in FIG. 1, the system 100 for object identification may include a processor 110 for object identification, an image capture device 120 and a data storage 130. The image capture device 120 may be configured to capture an image frame of an object to be detected. The image frame may be periodically refreshed and fetched by the processor 110 from the image captured device 120. The processor 110 may be coupled to the image capture device 120 via an image interface 140 to retrieve one or more appearance features of the object from the image frame. The object may include more than one modality that can be detected for the object identification, and accordingly, the processor may retrieve features of different modalities. As indicated above, the term "modality" may refer to a particular form in which a portion of the object appears or behaves and by which the object can be identified. The portion of the object may include one or more distinctive and measurable characteristics of the object. For example, a person may be identified from a face modality and a body modality. Accordingly, the processor 110 may retrieve one or more features of the face modality of the person from the image frame to perform the face identification, retrieve one or more features of the body modality of the person from the current image frame to perform the body identification, and obtain a final identification result by fusing the face identification and the body identification.

The processor 110 may be configured to perform the object identification based on the image frame including the object fetched from the image capture device 120. As shown in FIG. 1, the processor 110 may include an object track module 111, a first object identification module 112, an adaptive learning and training module 113 and a second object identification module 114 and a fusion module 115.

Generally, the image frame including the object may be periodically refreshed and fetched by the processor 110 for performing the object identification. For example, the processor 110 may identify the object every 5 to 8 image frames to ensure the proper identification in cases where the object moves quickly. However, when the processor 110 determines that the object also appears in a previous image frame and has been identified during the object identification based on the previous image frame, the identifier of the object can be directly copied from the identification result based on the previous image frame and there is no need to do identification again. Therefore, the processor 110 may include the object track module 111 to continuously track the object. Since the computational cost of the object track is relatively lower compared with the object identification, the object track module 111 can help to reduce computational burden and ensure the real-time performance of the system.

Specifically, the object track module 111 may be configured to track the object to determine whether the object appears in the previous image frame of the image frame and is identified based on the previous image frame. In response to a tracking result from the object track module 111, the other modules in the processor 110 may take different actions which will be discussed in detail below.

The first object identification module 112 may be configured to perform a first object identification based on one or more features of a first modality of the object retrieved from the image frame including the object and a first database 131 including first modality identification features labeled with corresponding object identifiers. The image frame may be fetched from the image capture device 120 via the image interface 140. The first database 131 may be stored in the data storage 130 and accessible via a data interface 150.

Figure 2A:
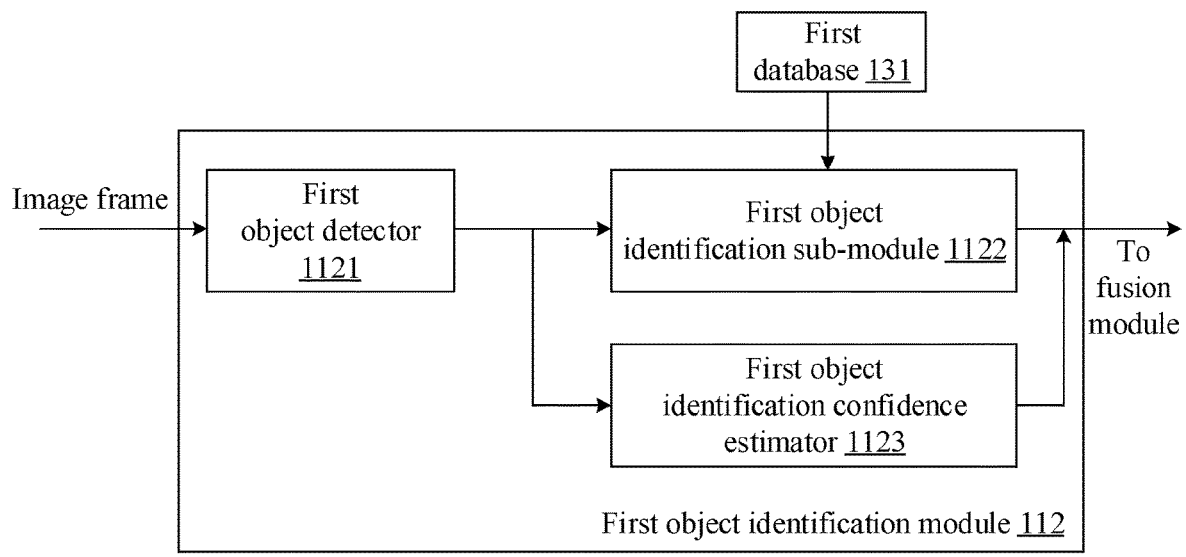
FIG. 2A and FIG. 2B illustrate exemplary block diagrams of first and second object identification modules in the system for object identification of FIG. 1 in accordance with an embodiment of the present application.

As shown in FIG. 2A, the first object identification module 112 may include a first object detector 1121, a first object identification sub-module 1122 and a first object identification confidence estimator 1123. For example, when the object is a person, the first object identification module 112 may be a face identification module, the first object detector 1121 may be a face detector, the first object identification sub-module 1122 may be a face identification sub-module, the first object identification confidence estimator 1123 may be a face identification confidence estimator, and the first database 131 may be a database including face identification features labeled with corresponding person identifiers.

Specifically, the face detector may be configured to locate the face, and the face identification sub-module may be configured to calculate discriminative face appearance features and compare these face features with the face identification features labeled with the person's identifier and stored in the database to identify the person and output the face identification result. Various types of face detection and identification methods can be used. For example, the RetinaFace detector disclosed in Deng, Jiangkang, et al. "RetinaFace: Single-stage Dense Face Localisation in the Wild", arXiv preprint arXiv: 1905.00641, 2019 may be used herein as the face detector, and the Arcface face recognition method disclosed in Jiankang, et al. "Arcface: Additive angular margin loss for deep face recognition", arXiv preprint arXiv: 1801.07698, 2019 may be used herein for the face identification. The entire contents of these two articles are incorporated herein by reference.

It is noted that a new submodule called the first object identification confidence estimator 1123 is introduced and aims to estimate uncertainty of a first identification result. For example, when the object is a person, the face identification confidence estimator aims to measure the uncertainty of the face identification result. Based on the observation that the performance of the face identification may drastically drop when the person has a large head pose, the head pose of the person may be measured to estimate the face identification confidence. It is well known that the head pose may be represented by yaw, pitch and roll of the head, and thus the yaw, pitch and roll of the head may be measured to estimate the face identification confidence. Heuristically, when the head pose increases (e.g. when any of yaw, pitch and roll of the head increases), the face identification confidence will decrease. The face identification confidence may achieve a maximum value of 1.0 for a frontal face.

The second object identification module 114 may be configured to perform a second object identification based on one or more features of a second modality of the object retrieved from the image frame including the object and a second database 132 including second modality identification features labeled with corresponding object identifiers. The second database 132 may be stored in the data storage 130 and accessible via the data interface 150.

Figure 2B:
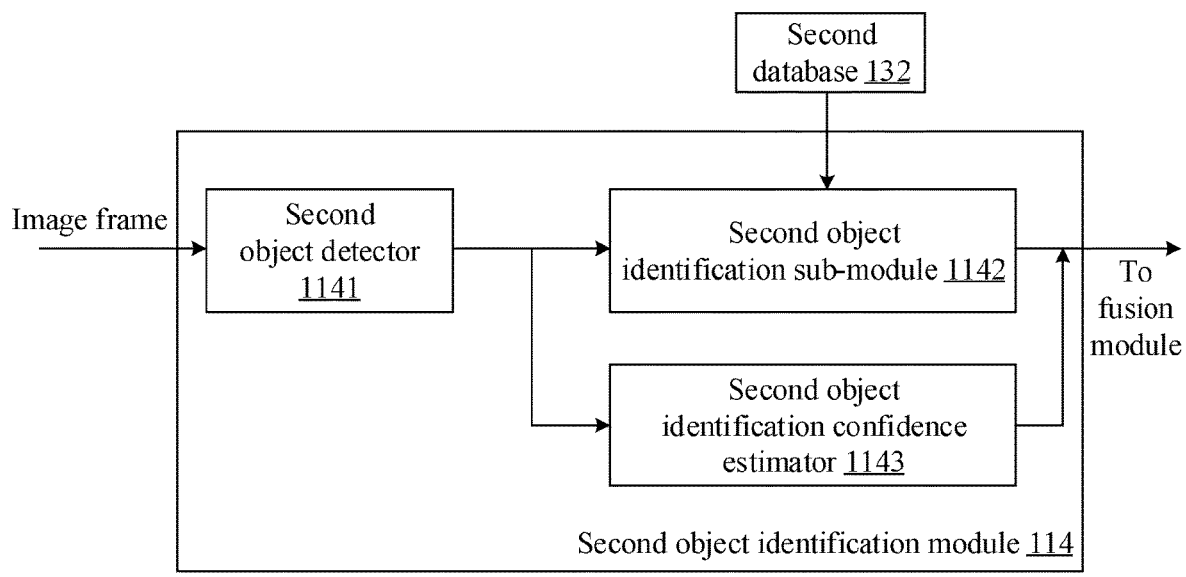

As shown in FIG. 2B, the second object identification module 114 may include a second object detector 1141, a second object identification sub-module 1142 and a first object identification confidence estimator 1143. For example, when the object is a person, the second object identification module 114 may be a body identification module, the second object detector 1141 may be a body detector, the second object identification sub-module 1142 may be a body identification sub-module, the second object identification confidence estimator 1143 may be a body identification confidence estimator, and the second database 132 may be a database including body identification features labeled with corresponding person identifiers.

Specifically, the body detector may be configured to locate the body, and the body identification sub-module may be configured to calculate discriminative body appearance features and compare these body features with the body identification features labeled with the person's identifier and stored in the database to identify the person and output the body identification result. Various types of body detection and identification methods can be used. For example, the body detection method disclosed in Howard, Andrew G., et al. "Mobilenets: Efficient convolutional neural networks for mobile vision applications", arXiv preprint arXiv: 1704.04861, 2017 may be used herein for the body detection, and the body identification method disclosed in Zhang, Xuan, et al. "Alignedreid: Surpassing human-level performance in person re-identification", arXiv preprint arXiv: 1711.08184, 2017 may be used herein for the body identification. The entire contents of these two articles are incorporated herein by reference.

In addition, the second object identification confidence estimator 1143 is introduced and aims to estimate uncertainty of a second identification result. For example, when the object is a person, the body identification confidence estimator aims to measure the uncertainty of the body identification result. A large-scaled study about how the body orientation affects the body identification result is disclosed in Sun, Xiaoxiao and Zheng, Liang. "Dissecting Person Re-identification from the Viewpoint of Viewpoint", arXiv: 1812.02162, 2019. Based on such a study, the body identification confidence may be estimated by measuring a body orientation of the person. The entire content of the article is incorporated herein by reference.

As described above, both the face features and the body features may be considered when identifying the person. In other words, a final identification result for the person may depend on both the face identification result and the body identification result. Accordingly, the processor 110 for object identification may include the fusion module 115, which may be configured to determine the final object identification result by integrating the first identification result output by the first object identification module and the second identification result output by the second object identification module.

In an embodiment of the present application, the first identification confidence estimated by the first identification confidence estimator 1123 and the second identification confidence estimated by the second identification confidence estimator 1143 may be utilized in the fusion module 115 to determine the final object identification result.

For example, when the object is a person, the first identification confidence may be the face identification confidence and defined as $a_{face}$, and the second identification confidence may be the body identification confidence and defined as $a_{body}$. Also, a face confidence threshold $t_{face}$ and a body confidence threshold $t_{body}$ may be predefined.

When the face identification confidence $a_{face}$ is greater than or equal to the face confidence threshold $t_{face}$, the face identification result may be considered to be reliable and the face identification result may be determined as the final identification result. When the face identification confidence $a_{face}$ is less than the face confidence threshold $t_{face}$ and the body identification confidence $a_{body}$ is greater than or equal to the body confidence threshold $t_{body}$, the face identification result may be considered to be not reliable but the body identification result may be considered to be reliable, so the body identification result may be determined as the final identification result.

When the face identification confidence $a_{face}$ is less than the face confidence threshold $t_{face}$ and the body identification confidence $a_{body}$ is also less than the body confidence threshold $t_{body}$, both the face identification result and the body identification result may be considered to be not reliable enough to be determined as the final identification result. In this case, a weighted face identification confidence and a weighted body identification confidence may be considered to determine the final identification result. Specifically, the face identification confidence may be weighted by a face weight value to obtain the weighted face identification confidence, and the body identification confidence may be weighted by a body weight value to obtain the weighted body identification confidence. When the weighted face identification confidence is greater than or equal to the weighted body identification confidence, the face identification result may be determined as the final identification result. Otherwise, when the weighted body identification confidence is greater than or equal to the weighted face identification confidence, the body identification result may be determined as the final identification result. The face weight value may be set greater than the body weight value since the face identification result may be generally regarded as more reliable than the body identification result.

Thus, according to the embodiment of the present application, the fusion module 115 may be configured to determine the first identification result as the final identification result when the first identification confidence is greater than or equal to a first confidence threshold; determine the second identification result as the final identification result when the first identification confidence is less than the first confidence threshold and the second identification confidence is greater than or equal to a second confidence threshold; and determine the final identification result by comparing the first identification confidence weighted by a first weight value and the second identification confidence weighted by a second weight value, when both the first identification confidence is less than the first confidence threshold and the second identification confidence is less than the second confidence threshold, wherein the first weight value is greater than the second weight value, the first identification result is determined as the final identification result when the weighted first identification confidence is greater than or equal to the weighted second identification confidence, and the second identification result is determined as the final identification result when the weighted first identification confidence is less than the weighted second identification confidence.

In addition, in order to provide a fused identification result robustly, the system may continuously and adaptively learn and accumulate appearance features of the object for realizing an accurate long-term identification. Accordingly, the processor 110 for object identification may include the adaptive learning and training module 113, which may be configured to update the second database by adaptively learning a new second modality identification feature according to a real-time result of the first object identification, and train the second object identification with the updated second database.

FIG. 3 illustrates an exemplary algorithm for an adaptive learning and training process in accordance with an embodiment of the present application.

As shown by the exemplary algorithm, the adaptive learning and training process may be utilized to train the body identification based on the real-time result of the face identification. The algorithm may have four inputs: labeled face dataset $L_f$, labeled body dataset $L_b$, unlabeled body data $U_b$, and body tracking result, and output a well-trained body classifier $C_b$ for the body identification. Specifically, the labeled face dataset $L_f$ may include the face identification features labeled with the identifier of the person and stored in the first database; the labeled body dataset $L_b$ may include the body identification features labeled with the identifier of the person and stored in the second database; and the unlabeled body data $U_b$ may be a newly detected body feature of the person that is not labeled and stored in the second database.

With the help of the face identification confidence estimator, when the face identification confidence is greater than the face confidence threshold, the face identification result may be reliable and the identifier of the person may be determined according to the face identification result. In this case, the newly detected body feature of the person can be labeled with the identifier of the person as determined according to the face identification result, then moved to the labeled body dataset $L_b$ and stored in the second database. In other words, the second database may be updated by recording the newly detected body feature labeled with the identifier of the person. Then the body identification module can be trained with the updated second database. For example, when a person's clothes change, the body features of the person will have a large variance and the person may not be properly identified by the body identification. However, once a frontal face of the person can be seen, the person can be identified from the face features with high confidence, and then the new clothes may be labeled with the identifier of the person and recorded as a new body feature in the second database. By adaptively learning the new body feature, the system can be adapted to recognize the person in the future based on the updated database including the new body feature.

On the other hand, when the body identification result of the person is considered reliable and determined as the final identification result, a newly detected face feature of the person may be labeled with the identifier of the person as determined by the body identification result, and recorded in the first database. By adaptively learning the new face feature, the system can be adapted to recognize the person in the future based on the updated database including the new face feature. The algorithm for training the face identification module based on a real-time body identification result may be similar to the exemplary algorithm as shown in FIG. 3 and will not be shown herein.

Figure 4:
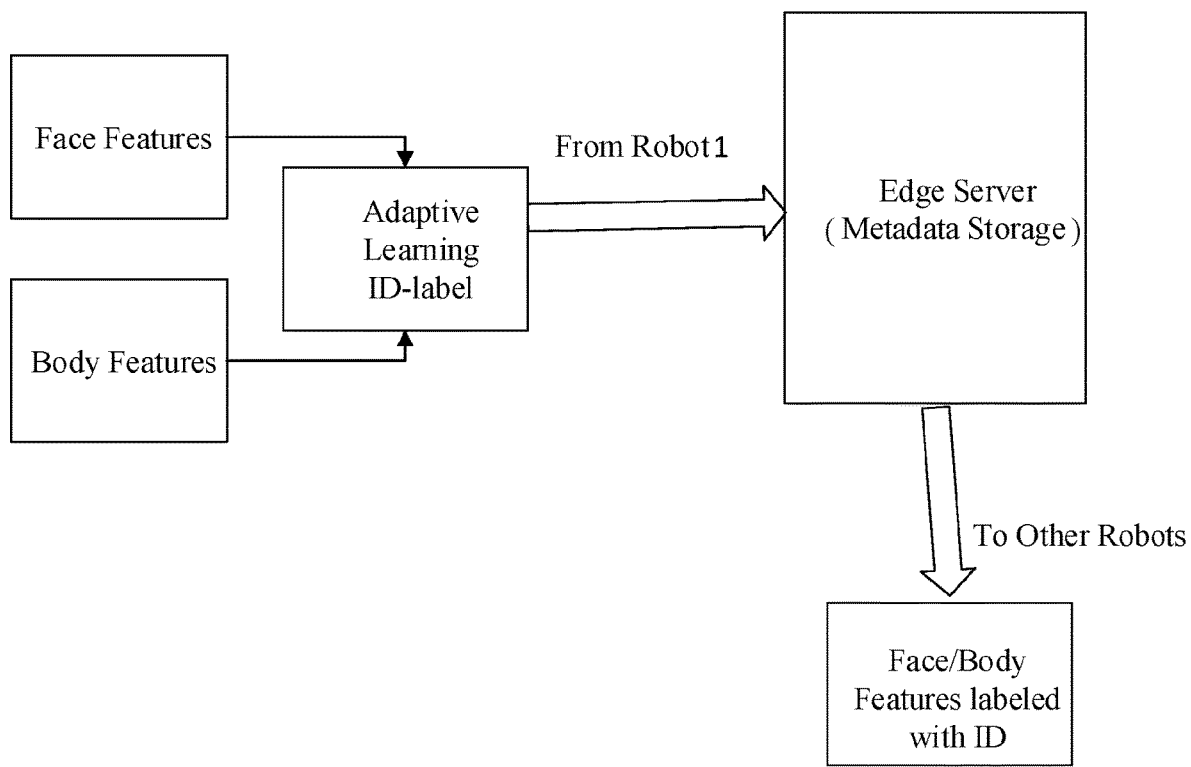
FIG. 4 illustrates an exemplary scene where object identification data obtained by adaptive learning is accessible to a plurality of parties in accordance with an embodiment of the present application.

In an embodiment of the present application, the data storage 130 may be an edge server connected to a plurality of parties, and the first modality identification features and the second modality identification features may be labeled with corresponding object identifiers and stored on the edge server as metadata. FIG. 4 illustrates an exemplary scene where object identification data obtained by adaptive learning is accessible to a plurality of parties in accordance with an embodiment of the present application. For example, multiple robots can access or learn the face and body identification features as they are instantiated, which may be useful in a hospitality or retail environment for identifying employees. As shown in FIG. 4, Robot1 may adaptively learn and accumulate labeled face and body identification features during an identification process, and store these labeled face and body identification features on an edge server as metadata. Then other robots may access the metadata on the edge server to obtain the labeled face and body identification features for identifying a person.

According to the embodiments of the present application, the system for object identification can determine a fusion identification result of an object by integrating multiple identification results of multiple modality identifications, and can continuously and adaptively learn and accumulate appearance features of the object for realizing an accurate long-term identification. For ease of description, only two modality identifications are illustrated and discussed in the above example embodiments, but it should be understood the concept of the present application can be easily adapted to fuse multiple identification results of multiple modality identifications and implement the adaptive learning and training for multiple modality identifications to ensure accuracy and reliability of the fusion identification result even when one or more features of certain modalities of the object significantly change or are not available for the object identification.

Figure 5:
FIG. 5 shows a series of screen-snaps during runtime of the system for object identification when identifying a person whose face is invisible, in accordance with an embodiment of the present application.

FIG. 5 shows a series of screen-snaps during runtime of the system for object identification when identifying a person whose face is invisible, in accordance with an embodiment of the present application. The series of screen-snaps respectively show a fusion identification result, a body identification result and a face identification result. In this example case, since the face is invisible, the face identification confidence may be very low and the face identification result may be not reliable. In contrast, the body identification confidence is estimated as 0.66 and the body identification result shows the person is identified as Haibing. According to the fusion process as described above, since the face identification confidence is lower than the face confidence threshold and the body identification confidence is greater than a preset body confidence threshold (e.g. 0.5), the body identification result may be determined as the final identification result. As shown in the leftmost screen-snap, the person may be identified as Haibing according to the body identification result. This figure shows that the proposed system can successfully recognize a person even when the person's face is invisible.

Figure 6A:
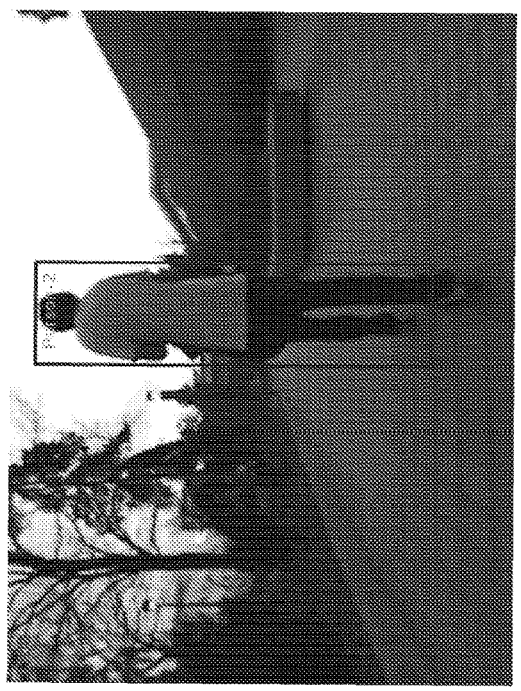
FIG. 6A to FIG. 6D show a series of screen-snaps during runtime of the system for object identification when identifying a person whose body features change, in accordance with an embodiment of the present application.
Figure 6B:
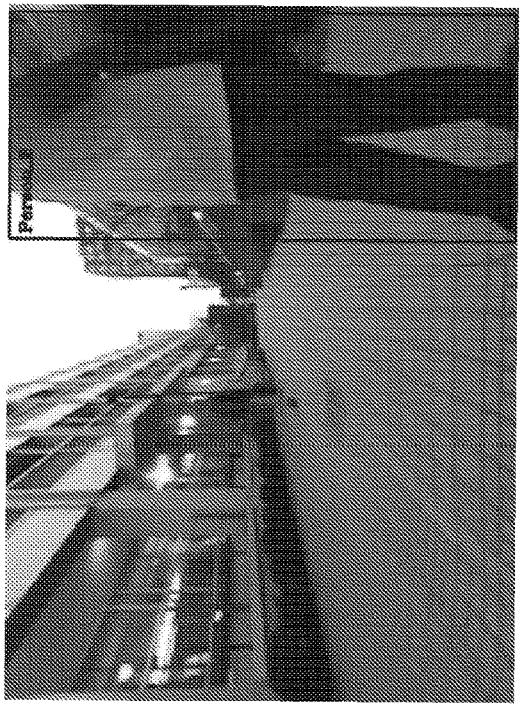
Figure 6C:
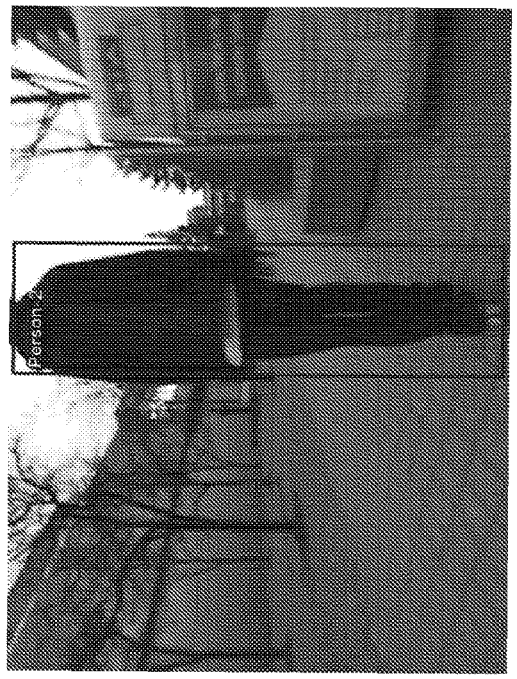
Figure 6D:

FIG. 6A to FIG. 6D show a series of screen-snaps during runtime of the system for object identification when identifying a person whose body features change, in accordance with an embodiment of the present application. Specifically, FIG. 6A shows that the person is identified as Person-2; FIG. 6B shows the person can be identified as Person-2 even when the clothes of the person change; FIG. 6C shows the person can be identified as Person-2 even when the person has a large body pose; and FIG. 6D shows the person can be identified as Person-2 even when only a partial body of the person is captured in the image frame.

Figure 7:
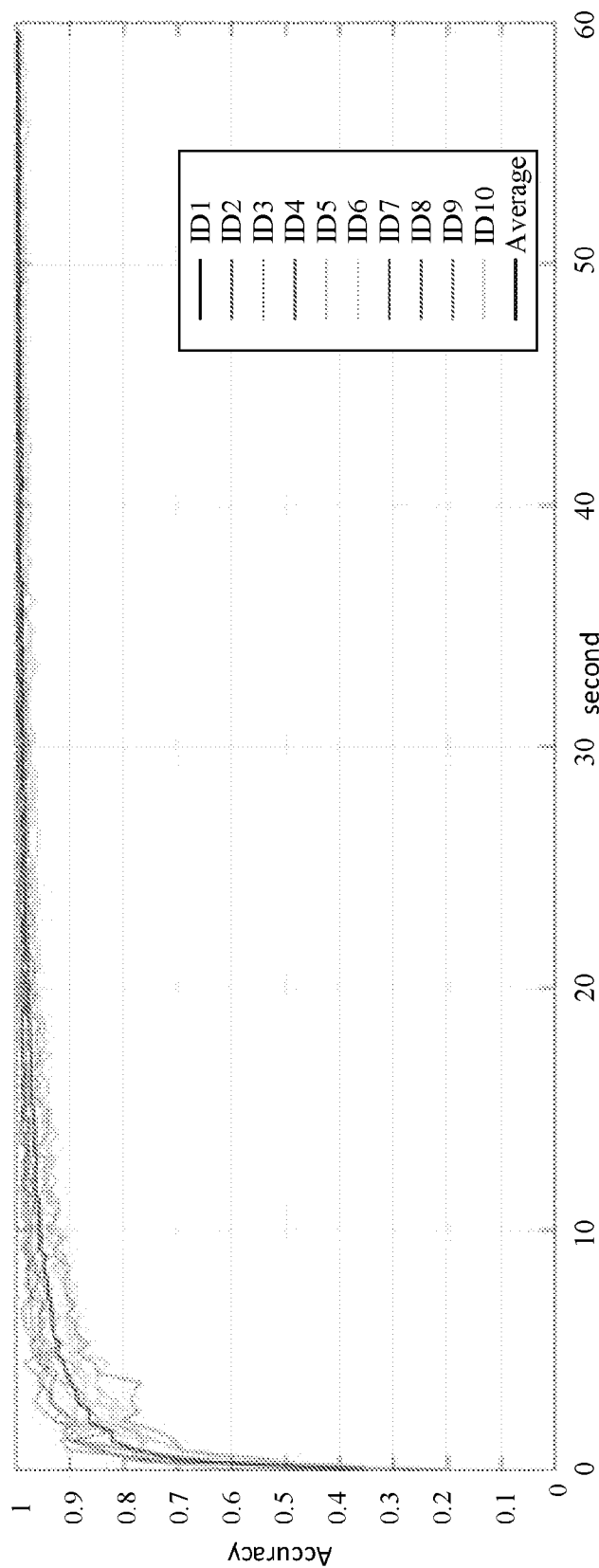
FIG. 7 depicts identification accuracy curves over time for identifications of 10 persons in a test experiment, in accordance with an embodiment of the present application.

In addition, extensive experiments have been carried out to demonstrate the adaptive learning ability of the proposed system. In a test experiment, more than 10,000 images captured from 10 persons are collected, which cover various daily cases, such as illumination variation, free action (like large body pose), cloth changing, etc. FIG. 7 depicts identification accuracy curves over time for identifications of 10 persons in a test experiment, in accordance with an embodiment of the present application. It can be seen, as time goes by, more appearance features of these persons may be accumulated and used as training samples, and accordingly the accuracies of the identifications become higher. Results as shown in FIG. 7 demonstrates that the proposed system for object identification can quickly achieve an identification accuracy higher than 95% in 10 seconds and even higher than 98% in 22 seconds.

Figure 8:
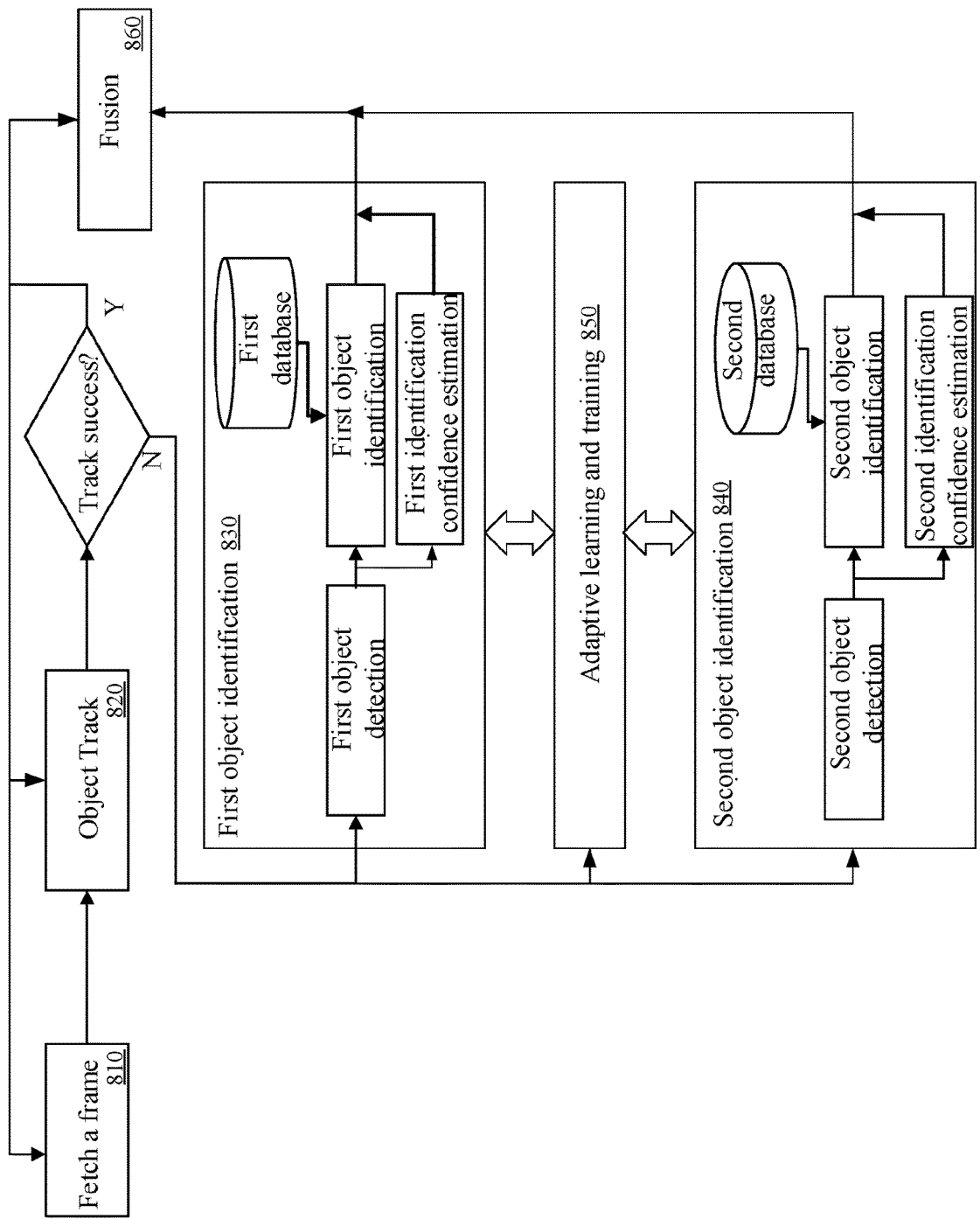
FIG. 8 depicts a flowchart of a method for object identification based on adaptive learning and training in accordance with an embodiment of the present application.

In an embodiment of the present application, a method for object identification based on adaptive learning and training is provided and shown by the flowchart in FIG. 8. The method can be executed as instructions on a machine, where the instructions are included on at least one machine readable medium or at least one non-transitory machine readable storage medium. Additionally, operations of the method may be performed using computational hardware, such as that described above or below.

The method can include the operations of fetching an image frame of an object captured by an image capture device, as in block 810; tracking the object to determine whether the object appears in a previous image frame of the image frame and is identified based on the previous image frame, as in block 820; performing a first object identification based on one or more features of a first modality of the object retrieved from the image frame and a first database including first modality identification features labeled with corresponding object identifiers, as in block 830; performing a second object identification based on one or more features of a second modality of the object retrieved from the image frame and a second database including second modality identification features labeled with corresponding object identifiers, as in block 840; updating the second database by adaptively learning a new second modality identification feature according to a first identification result of the first object identification, and training the second object identification with the updated second database, as in block 850; and determining a final identification result of the object identification by integrating a first identification result of the first object identification and a second identification result of the second object identification, as in block 860.

As in block 830, the method for object identification may further include the operation of estimating a first identification confidence for measuring uncertainty of the first identification result. Accordingly, in block 860, determining the final identification result may include: determining the first identification result as the final identification result when the first identification confidence is greater than or equal to a first confidence threshold. Also, in block 850, updating the second database may include: recording the new second modality identification feature into the second database when the first identification confidence is greater than or equal to the first confidence threshold. Here, the new second modality identification feature may be selected from the one or more features of the second modality of the object and labeled with an identifier of the object determined by the first identification result.

Similarly, as in block 840, the method for object identification may further include the operation of estimating a second identification confidence for measuring uncertainty of the second identification result. Accordingly, in block 860, determining the final identification result may include: determining the second identification result as the final identification result when the first identification confidence is less than the first confidence threshold and the second identification confidence is greater than or equal to a second confidence threshold. Also, as in block 850, the method for object identification may further include the operations of updating the first database by adaptively learning and recording a new first modality identification feature into the first database when the second identification result is determined as the final identification result, and training the first object identification based on the updated first database. Here, the new first modality identification feature may be selected from the one or more features of the first modality of the object and labeled with an identifier of the object determined by the second identification result.

In addition, in block 860, determining the final identification result may further include: determining the final identification result by comparing the first identification confidence weighted by a first weight value and the second identification confidence weighted by a second weight value, when both the first identification confidence is less than the first confidence threshold and the second identification confidence is less than the second confidence threshold. In this case, the first weight value may be set greater than the second weight value, the first identification result may be determined as the final identification result when the weighted first identification confidence is greater than or equal to the weighted second identification confidence, and the second identification result may be determined as the final identification result when the weighted first identification confidence is less than the weighted second identification confidence.

According to an embodiment of the present application, the image frame including the object may be periodically refreshed and fetched by a processor to perform the first object identification and the second object identification. As in block 820, the method for object identification may include the operation of tracking the object to determine whether the object appears in a previous image frame of a current image frame including the object and is identified based on the previous image frame. In response to a tracking result, in block 860, determining the final identification result may include: determining, when the object is identified based on the previous image frame, an identification result for the object based on the previous image frame as the final identification result; and determining, when the object is not identified based on the previous image frame, the final identification result according to the first object identification and the second object identification based on the current image frame. In addition, when it is determined the object has been identified based on the previous image frame, the first object identification and the second object identification based on the current image frame may be suspended for saving the computational cost.

The details about the operations of the method for object identification can be easily understood by referring to the foregoing description about the corresponding devices or modules in the system 100 of FIG. 1 and will not be described again.

In addition, although some of the operations are shown in sequence, it is not meant to limit that the operations must be performed depending on the order as shown. For example, some operations may happen concurrently, or the order of some operations may be reversed. Also, some operations may be not necessary and may be removed depending on practical application requirements.

Figure 9:
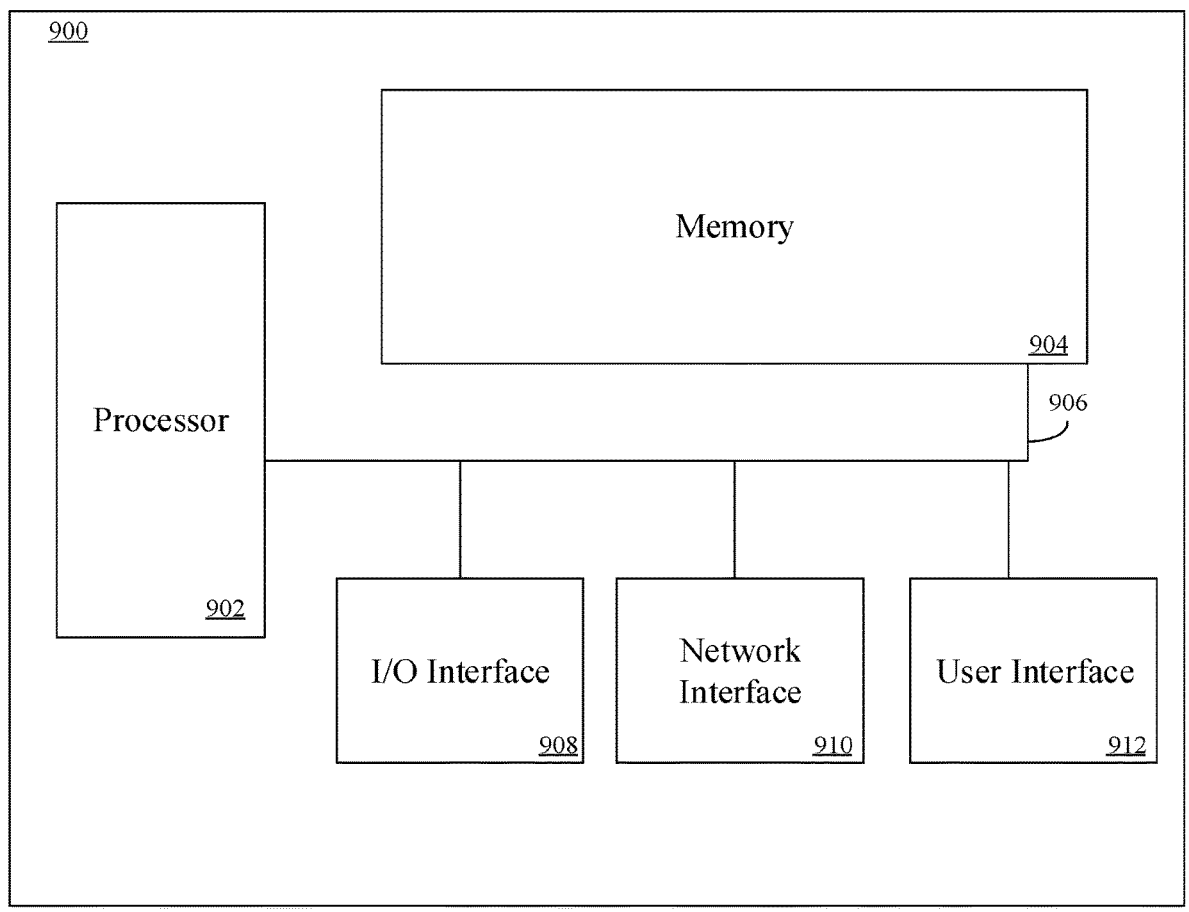
FIG. 9 illustrates an exemplary computing system in which the method for object identification of FIG. 8 may be implemented, in accordance with an embodiment of the present application.

FIG. 9 illustrates an exemplary computing system 900 in which the method for object identification of FIG. 8 may be implemented, in accordance with an embodiment of the present application. The computing system 900 may include a processor 902 in communication with a memory 704. The memory 704 can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The computing system 900 may additionally include a local communication interface 906 for connectivity between the various components of the system. For example, the local communication interface 906 may be a local data bus and/or any related address or control busses as may be desired.

The computing system or device 900 may also include an I/O (input/output) interface 908 for controlling the I/O functions of the system, as well as for I/O connectivity to devices outside of the computing system 900. A network interface 910 may also be included for network connectivity. The network interface 910 may control network communications both within the system and outside of the system. The network interface may include a wired interface, a wireless interface, a Bluetooth interface, optical interface, and the like, including appropriate combinations thereof. Furthermore, the computing system 900 may additionally include a user interface 912 as well as various other components that would be beneficial for such a system.

The processor 902 may be a single processor or multiple processors, and the memory 904 may be a single memory or multiple memories. The local communication interface 906 may be used as a pathway to facilitate communication between any of a single processor, multiple processors, a single memory, multiple memories, the various interfaces, and the like, in any useful combination.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium, wherein, when the program code is loaded into and executed by a machine, such as a computer, the machine becomes an apparatus for practicing the various techniques. The non-transitory computer readable storage medium may be a computer readable storage medium that does not include signal. In the case of program code execution on programmable computers, the computing system may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Exemplary systems or devices may include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

The following paragraphs describe examples of various embodiments.

Example 1 includes a processor for object identification, configured to: perform a first object identification based on one or more features of a first modality of an object retrieved from an image frame including the object and a first database including first modality identification features labeled with corresponding object identifiers; perform a second object identification based on one or more features of a second modality of the object retrieved from the image frame and a second database including second modality identification features labeled with corresponding object identifiers; update the second database by adaptively learning a new second modality identification feature according to a first identification result of the first object identification; train the second object identification with the updated second database; and determine a final identification result of the object identification by integrating a first identification result of the first object identification and a second identification result of the second object identification.

Example 2 includes the processor of example 1, further configured to: estimate, when performing the first object identification, a first identification confidence for measuring uncertainty of the first identification result; and determine the first identification result as the final identification result when the first identification confidence is greater than or equal to a first confidence threshold.

Example 3 includes the processor of example 2, further configured to: update the second database by recording the new second modality identification feature into the second database when the first identification confidence is greater than or equal to the first confidence threshold, wherein the new second modality identification feature is selected from the one or more features of the second modality of the object and labeled with an identifier of the object determined by the first identification result.

Example 4 includes the processor of example 2, further configured to: estimate, when performing the second object identification, a second identification confidence for measuring uncertainty of the second identification result; and determine the second identification result as the final identification result when the first identification confidence is less than the first confidence threshold and the second identification confidence is greater than or equal to a second confidence threshold.

Example 5 includes the processor of example 4, further configured to: update the first database by adaptively learning and recording a new first modality identification feature into the first database when the second identification result is determined as the final identification result, wherein the new first modality identification feature is selected from the one or more features of the first modality of the object and labeled with an identifier of the object determined by the second identification result; and train the first object identification with the updated first database.

Example 6 includes the processor of example 4, further configured to: determine the final identification result by comparing the first identification confidence weighted by a first weight value and the second identification confidence weighted by a second weight value, when both the first identification confidence is less than the first confidence threshold and the second identification confidence is less than the second confidence threshold, wherein the first weight value is greater than the second weight value, the first identification result is determined as the final identification result when the weighted first identification confidence is greater than or equal to the weighted second identification confidence, and the second identification result is determined as the final identification result when the weighted first identification confidence is less than the weighted second identification confidence.

Example 7 includes the processor of example 1, wherein the image frame is periodically refreshed and provided to the processor for performing the first object identification and the second object identification.

Example 8 includes the processor of example 7, further configured to: track the object to determine whether the object appears in a previous image frame of the image frame and is identified based on the previous image frame; determine, when the object is identified based on the previous image frame, an identification result for the object based on the previous image frame as the final identification result of the object identification, and suspend the first object identification and the second object identification based on the image frame; and determine, when the object is not identified based on the previous image frame, the final identification result according to the first object identification and the second object identification based on the image frame.

Example 9 includes the processor of any of examples 1 to 8, wherein the object is a person, the first modality of the object is a face modality of the person, and the second modality of the object is a body modality of the person.

Example 10 includes the processor of example 9, wherein the first identification confidence is a face identification confidence depending on a head pose of the person.

Example 11 includes the processor of example 9, wherein the second identification confidence is a body identification confidence depending on a body orientation of the person.

Example 12 includes a device for object identification, including: an image interface coupled to an image capture device; a data interface coupled to a data storage; and the processor for object identification according to any of examples 1 to 11, wherein the processor is coupled to the image interface to retrieve the one or more features of the first modality of the object and the one or more features of the second modality of the object from the image frame including the object captured by the image capture device; and the processor is coupled to the data interface to access the first database including the first modality identification features and the second database including second modality identification features from the data storage.

Example 13 includes a system for object identification, including: the processor for object identification according to any of examples 1 to 11; an image capture device configured to capture the image frame including the object; and a data storage configured to store the first database including the first modality identification features and the second database including the second modality identification features, wherein the processor is coupled to the image capture device via an image interface to retrieve the one or more features of the first modality of the object and the one or more features of the second modality of the object from the image frame; and the processor is coupled to the data storage via a data interface to access the first database including the first modality identification features and the second database including the second modality identification features.

Example 14 includes the system of example 13, wherein the data storage is an edge server connected to a plurality of parties, and the first database including the first modality identification features and the second database including the second modality identification features are accessible to the plurality of parties for object identification on the plurality of parties.

Example 15 includes a method for object identification, including: performing a first object identification based on one or more features of a first modality of an object retrieved from an image frame including the object and a first database including first modality identification features labeled with corresponding object identifiers; performing a second object identification based on one or more features of a second modality of the object retrieved from the image frame and a second database including second modality identification features labeled with corresponding object identifiers; updating the second database by adaptively learning a new second modality identification feature according to a first identification result of the first object identification; training the second object identification with the updated second database; and determining a final identification result of the object identification by integrating a first identification result of the first object identification and a second identification result of the second object identification.

Example 16 includes the method of example 15, further including: estimating, when performing the first object identification, a first identification confidence for measuring uncertainty of the first identification result, wherein the determining the final identification result includes: determining the first identification result as the final identification result when the first identification confidence is greater than or equal to a first confidence threshold.

Example 17 includes the method of example 16, wherein the updating the second database includes: recording the new second modality identification feature into the second database when the first identification confidence is greater than or equal to the first confidence threshold, wherein the new second modality identification feature is selected from the one or more features of the second modality of the object and labeled with an identifier of the object determined by the first identification result.

Example 18 includes the method of example 16, further including: estimating, when performing the second object identification, a second identification confidence for measuring uncertainty of the second identification result, wherein the determining the final identification result further includes: determining the second identification result as the final identification result when the first identification confidence is less than the first confidence threshold and the second identification confidence is greater than or equal to a second confidence threshold.

Example 19 includes the method of example 18, further including: updating the first database by adaptively learning and recording a new first modality identification feature into the first database when the second identification result is determined as the final identification result, wherein the new first modality identification feature is selected from the one or more features of the first modality of the object and labeled with an identifier of the object determined by the second identification result; and training the first object identification based on the updated first database.

Example 20 includes the method of example 18, wherein the determining the final identification result further includes: determining the final identification result by comparing the first identification confidence weighted by a first weight value and the second identification confidence weighted by a second weight value, when both the first identification confidence is less than the first confidence threshold and the second identification confidence is less than the second confidence threshold, wherein the first weight value is greater than the second weight value, the first identification result is determined as the final identification result when the weighted first identification confidence is greater than or equal to the weighted second identification confidence, and the second identification result is determined as the final identification result when the weighted first identification confidence is less than the weighted second identification confidence.

Example 21 includes the method of example 15, wherein the image frame including the object is periodically refreshed for the first object identification and the second object identification.

Example 22 includes the method of example 21, further including: tracking the object to determine whether the object appears in a previous image frame of the image frame and is identified based on the previous image frame; determining, when the object is identified based on the previous image frame, an identification result for the object based on the previous image frame as the final identification result of the object identification, and suspending the first object identification and the second object identification based on the image frame; and determining, when the object is not identified based on the previous image frame, the final identification result according to the first object identification and the second object identification based on the image frame.

Example 23 includes the method of any of examples 15 to 22, wherein the object is a person, the first modality of the object is a face modality of the person, and the second modality of the object is a body modality of the person.

Example 24 includes the method of example 23, wherein the first identification confidence is a face identification confidence depending on a head pose of the person.

Example 25 includes the method of example 23, wherein the second identification confidence is a body identification confidence depending on a body orientation of the person.

Example 26 includes a computer-readable medium having instructions stored thereon, the instructions, when executed by a processor, to cause the processor to perform the method for object identification according to any of examples 15 to 25.

Example 27 includes an apparatus for object identification, including: a first object identification module configured to perform a first object identification based on one or more features of a first modality of an object retrieved from an image frame including the object and a first database including first modality identification features labeled with corresponding object identifiers; a second object identification module configured to perform a second object identification based on one or more features of a second modality of the object retrieved from the image frame and a second database including second modality identification features labeled with corresponding object identifiers; an adaptive learning and training module configured to update the second database by adaptively learning a new second modality identification feature according to a first identification result of the first object identification, and train the second object identification with the updated second database; and a fusion module configured to determine a final identification result of the object identification by integrating a first identification result of the first object identification and a second identification result of the second object identification.

Example 28 includes the apparatus of example 27, wherein the first identification module includes a first identification confidence estimator configured to estimate a first identification confidence for measuring uncertainty of the first identification result; and the fusion module is further configured to determine the first identification result as the final identification result when the first identification confidence is greater than or equal to a first confidence threshold.

Example 29 includes the apparatus of example 28, wherein the adaptive learning and training module is further configured to update the second database by recording the new second modality identification feature into the second database when the first identification confidence is greater than or equal to the first confidence threshold, wherein the new second modality identification feature is selected from the one or more features of the second modality of the object and labeled with an identifier of the object determined by the first identification result.

Example 30 includes the apparatus of example 28, wherein the second identification module includes a second identification confidence estimator configured to estimate a second identification confidence for measuring uncertainty of the second identification result; and the fusion module is further configured to determine the second identification result as the final identification result when the first identification confidence is less than the first confidence threshold and the second identification confidence is greater than or equal to a second confidence threshold.

Example 31 includes the apparatus of example 30, wherein the adaptive learning and training module is further configured to: update the first database by adaptively learning and recording a new first modality identification feature into the first database when the second identification result is determined as the final identification result, wherein the new first modality identification feature is selected from the one or more features of the first modality of the object and labeled with an identifier of the object determined by the second identification result; and train the first object identification based on the updated first database.

Example 32 includes the apparatus of example 30, wherein the fusion module is further configured to: determine the final identification result by comparing the first identification confidence weighted by a first weight value and the second identification confidence weighted by a second weight value, when both the first identification confidence is less than the first confidence threshold and the second identification confidence is less than the second confidence threshold, wherein the first weight value is greater than the second weight value, the first identification result is determined as the final identification result when the weighted first identification confidence is greater than or equal to the weighted second identification confidence, and the second identification result is determined as the final identification result when the weighted first identification confidence is less than the weighted second identification confidence.

Example 33 includes the apparatus of example 27, wherein the image frame including the object is periodically refreshed for the first object identification and the second object identification.

Example 34 includes the apparatus of example 33, further including: an object track module configured to track the object to determine whether the object appears in a previous image frame of the image frame and is identified based on the previous image frame, wherein the fusion module is configured to determine, when the object is identified based on the previous image frame, an identification result for the object based on the previous image frame as the final identification result of the object identification; and determine, when the object is not identified based on the previous image frame, the final identification result according to the first object identification and the second object identification based on the image frame; the first identification module is configured to suspend, when the object is identified based on the previous image frame, the first object identification based on the image frame; and the second identification module is configured to suspend, when the object is identified based on the previous image frame, the second object identification based on the image frame.

Example 35 includes the apparatus of any of examples 27 to 34, wherein the object is a person, the first modality of the object is a face modality of the person, and the second modality of the object is a body modality of the person.

Example 36 includes the apparatus of example 35, wherein the first identification confidence is a face identification confidence depending on a head pose of the person.

Example 37 includes the apparatus of example 35, wherein the second identification confidence is a body identification confidence depending on a body orientation of the person.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A processor for object identification, configured to:
perform a first object identification based on one or more features of a first modality of an object retrieved from an image frame including the object and a first database including first modality identification features labeled with corresponding object identifiers;
perform a second object identification based on one or more features of a second modality of the object retrieved from the image frame and a second database including second modality identification features labeled with corresponding object identifiers, wherein the image frame is periodically refreshed and provided to the processor for performing the first object identification and the second object identification;
update the second database by adaptively learning a new second modality identification feature according to a first identification result of the first object identification;
train the second object identification with the updated second database;
determine a final identification result of the object identification by integrating the first identification result of the first object identification and a second identification result of the second object identification;
track the object to determine whether the object appears in a previous image frame of the image frame and is identified based on the previous image frame;
determine, when the object is identified based on the previous image frame, an identification result for the object based on the previous image frame as the final identification result of the object identification, and suspend the first object identification and the second object identification based on the image frame; and
determine, when the object is not identified based on the previous image frame, the final identification result according to the first object identification and the second object identification based on the image frame.

2. The processor of claim 1, further configured to:
estimate, when performing the first object identification, a first identification confidence for measuring uncertainty of the first identification result; and
determine the first identification result as the final identification result when the first identification confidence is greater than or equal to a first confidence threshold.

3. The processor of claim 2, further configured to:
update the second database by recording the new second modality identification feature into the second database when the first identification confidence is greater than or equal to the first confidence threshold, wherein the new second modality identification feature is selected from the one or more features of the second modality of the object and labeled with an identifier of the object determined by the first identification result.

4. The processor of claim 2, further configured to:
estimate, when performing the second object identification, a second identification confidence for measuring uncertainty of the second identification result; and
determine the second identification result as the final identification result when the first identification confidence is less than the first confidence threshold and the second identification confidence is greater than or equal to a second confidence threshold.

5. The processor of claim 4, further configured to:
update the first database by adaptively learning and recording a new first modality identification feature into the first database when the second identification result is determined as the final identification result, wherein the new first modality identification feature is selected from the one or more features of the first modality of the object and labeled with an identifier of the object determined by the second identification result; and
train the first object identification with the updated first database.

6. The processor of claim 4, further configured to:
determine the final identification result by comparing the first identification confidence weighted by a first weight value and the second identification confidence weighted by a second weight value, when both the first identification confidence is less than the first confidence threshold and the second identification confidence is less than the second confidence threshold,
wherein the first weight value is greater than the second weight value, the first identification result is determined as the final identification result when the weighted first identification confidence is greater than or equal to the weighted second identification confidence, and the second identification result is determined as the final identification result when the weighted first identification confidence is less than the weighted second identification confidence.

7. The processor of claim 1, wherein the object is a person, the first modality of the object is a face modality of the person, and the second modality of the object is a body modality of the person.

8. The processor of claim 7, wherein the first identification confidence is a face identification confidence depending on a head pose of the person.

9. The processor of claim 7, wherein the second identification confidence is a body identification confidence depending on a body orientation of the person.

10. A device for object identification, comprising:
an image interface coupled to an image capture device;
a data interface coupled to a data storage; and
the processor for object identification according to claim 1,
wherein the processor is coupled to the image interface to retrieve the one or more features of the first modality of the object and the one or more features of the second modality of the object from the image frame including the object captured by the image capture device; and
the processor is coupled to the data interface to access the first database including the first modality identification features and the second database including second modality identification features from the data storage.

11. A system for object identification, comprising:
the processor for object identification according to claim 1;
an image capture device configured to capture the image frame including the object; and
a data storage configured to store the first database including the first modality identification features and the second database including the second modality identification features,
wherein the processor is coupled to the image capture device via an image interface to retrieve the one or more features of the first modality of the object and the one or more features of the second modality of the object from the image frame; and
the processor is coupled to the data storage via a data interface to access the first database including the first modality identification features and the second database including the second modality identification features.

12. The system of claim 11, wherein the data storage is an edge server connected to a plurality of parties, and the first database including the first modality identification features and the second database including the second modality identification features are accessible to the plurality of parties for object identification on the plurality of parties.

13. A method for object identification, comprising:
performing a first object identification based on one or more features of a first modality of an object retrieved from an image frame including the object and a first database including first modality identification features labeled with corresponding object identifiers;
performing a second object identification based on one or more features of a second modality of the object retrieved from the image frame and a second database including second modality identification features labeled with corresponding object identifiers, wherein the image frame is periodically refreshed and provided for the performing the first object identification and the second object identification;
updating the second database by adaptively learning a new second modality identification feature according to a first identification result of the first object identification;
training the second object identification with the updated second database; and
determining a final identification result of the object identification by integrating a first identification result of the first object identification and a second identification result of the second object identification;
tracking the object to determine whether the object appears in a previous image frame of the image frame and is identified based on the previous image frame;
determining, when the object is identified based on the previous image frame, an identification result for the object based on the previous image frame as the final identification result of the object identification, and suspend the first object identification and the second object identification based on the image frame; and
determining, when the object is not identified based on the previous image frame, the final identification result according to the first object identification and the second object identification based on the image frame.

14. The method of claim 13, further comprising:
estimating, when performing the first object identification, a first identification confidence for measuring uncertainty of the first identification result,
wherein the determining the final identification result comprises: determining the first identification result as the final identification result when the first identification confidence is greater than or equal to a first confidence threshold.

15. The method of claim 14, wherein the updating the second database comprises:
recording the new second modality identification feature into the second database when the first identification confidence is greater than or equal to the first confidence threshold, wherein the new second modality identification feature is selected from the one or more features of the second modality of the object and labeled with an identifier of the object determined by the first identification result.

16. The method of claim 14, further comprising:
estimating, when performing the second object identification, a second identification confidence for measuring uncertainty of the second identification result,
wherein the determining the final identification result further comprises: determining the second identification result as the final identification result when the first identification confidence is less than the first confidence threshold and the second identification confidence is greater than or equal to a second confidence threshold.

17. The method of claim 16, further comprising:
updating the first database by adaptively learning and recording a new first modality identification feature into the first database when the second identification result is determined as the final identification result, wherein the new first modality identification feature is selected from the one or more features of the first modality of the object and labeled with an identifier of the object determined by the second identification result; and
training the first object identification based on the updated first database.

18. The method of claim 16, wherein the determining the final identification result further comprises:
determining the final identification result by comparing the first identification confidence weighted by a first weight value and the second identification confidence weighted by a second weight value, when both the first identification confidence is less than the first confidence threshold and the second identification confidence is less than the second confidence threshold,
wherein the first weight value is greater than the second weight value, the first identification result is determined as the final identification result when the weighted first identification confidence is greater than or equal to the weighted second identification confidence, and the second identification result is determined as the final identification result when the weighted first identification confidence is less than the weighted second identification confidence.

19. The method of claim 13, wherein the object is a person, the first modality of the object is a face modality of the person, and the second modality of the object is a body modality of the person.

20. The method of claim 19, wherein the first identification confidence is a face identification confidence depending on a head pose of the person, and the second identification confidence is a body identification confidence depending on a body orientation of the person.

21. A non-transitory computer-readable medium having instructions stored thereon, the instructions, when executed by a processor, to cause the processor to perform the method for object identification according to claim 13.

22. A processor for object identification, configured to:
perform a first object identification based on one or more features of a first modality of an object retrieved from an image frame including the object and a first database including first modality identification features labeled with corresponding object identifiers;
perform a second object identification based on one or more features of a second modality of the object retrieved from the image frame and a second database including second modality identification features labeled with corresponding object identifiers;
update the second database by adaptively learning a new second modality identification feature according to a first identification result of the first object identification;
train the second object identification with the updated second database; and
determine a final identification result of the object identification by integrating the first identification result of the first object identification and a second identification result of the second object identification;
estimate, when performing the first object identification, a first identification confidence for measuring uncertainty of the first identification result;
determine the first identification result as the final identification result when the first identification confidence is greater than or equal to a first confidence threshold;
estimate, when performing the second object identification, a second identification confidence for measuring uncertainty of the second identification result;
determine the second identification result as the final identification result when the first identification confidence is less than the first confidence threshold and the second identification confidence is greater than or equal to a second confidence threshold; and
determine the final identification result by comparing the first identification confidence weighted by a first weight value and the second identification confidence weighted by a second weight value, when both the first identification confidence is less than the first confidence threshold and the second identification confidence is less than the second confidence threshold, wherein the first weight value is greater than the second weight value, the first identification result is determined as the final identification result when the weighted first identification confidence is greater than or equal to the weighted second identification confidence, and the second identification result is determined as the final identification result when the weighted first identification confidence is less than the weighted second identification confidence.

* * * * *